United States Patent
Mortensen

[11] 3,812,551
[45] May 28, 1974

[54] STREET SWEEPER BROOM DRIVE

[75] Inventor: Donald G. Mortensen, Upland, Calif.

[73] Assignee: Wayne Manufacturing Company, Pamona, Calif.

[22] Filed: Oct. 26, 1972

[21] Appl. No.: 301,184

Related U.S. Application Data

[62] Division of Ser. No. 183,984, Sept. 27, 1971, Pat. No. 3,726,109.

[52] U.S. Cl.............................. 15/179, 15/82, 15/83, 15/84, 15/180, 64/30 D
[51] Int. Cl.......................... A46b 13/02, F16b 7/02
[58] Field of Search...... 15/50 R, 50 C, 49 R, 49 C, 15/82, 83, 84, 85, 179–183; 287/52.01, 52.06, 52.07; 64/30 D, 30 A, 30 C; 29/117

[56] References Cited
UNITED STATES PATENTS

| | | |
|---|---|---|
| 1,968,986 | 8/1934 | Blackhall et al.................. 15/179 X |
| 3,310,825 | 3/1967 | Tamny............................... 15/179 X |
| 3,649,985 | 3/1972 | Hunt.................................... 15/179 |

*Primary Examiner*—Edward L. Roberts

[57] ABSTRACT

The invention provides a rotational power transmission for driving debris displacement means in street sweepers, the transmission including an innersection and an outer section carrying or connected to the debris displacement means, the sections having opposed conical surfaces one of which contains a deformed elastomeric ring engageable and capable of slippage on the opposing conical surface as the debris displacement means encounters abnormal resistances to its normal movement.

17 Claims, 6 Drawing Figures

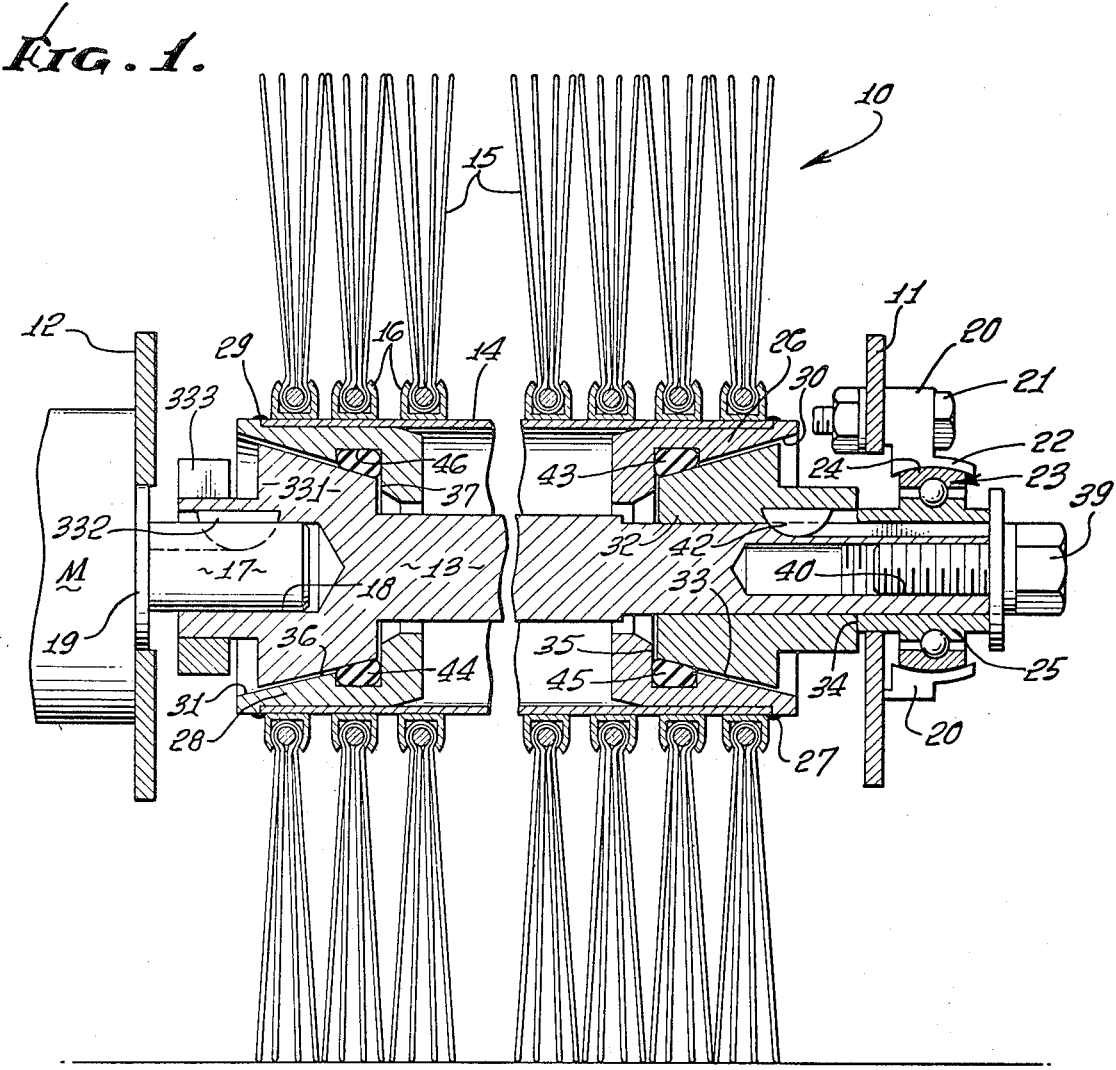

PATENTED MAY 28 1974  3,812,551

STREET SWEEPER BROOM DRIVE

REFERENCE TO RELATED APPLICATION

This application is a division of copending application Ser. No. 183,984 now U.S. Pat. No. 3,726,109 filed Sept. 27, 1971, on "STREET SWEEPER POWER TRANSMISSION COUPLINGS".

BACKGROUND OF THE INVENTION

Conventional street sweepers have debris displacement means including rotary pickup brooms, gutter brooms and squeegee carrying conveyors powered directly or indirectly by the sweeper vehicle engine. Any of these debris displacement means may be subject to movement resistances by the debris itself or extraneous objects, which advantageously could be relieved to prevent stoppage or overstress conditions as they arise.

SUMMARY OF THE INVENTION

The present invention achieves this general objective broadly by interposition in the power transmission of one or a pair of novel couplings having inherent capacities for slippage as an abnormal reistance or overstress condition arises.

More specifically, the invention has for its object to provide a power transmitting connection between a driving shaft and the debris displacement means comprising what may be termed inner and outer coupling sections characterized by their presentation of opposed conical surfaces, one of which carries a deformable elastomeric ring which normally transmits without slippage the drive from one section to the other but which upon abnormal resistance to the of said section rotation is capable of slippage on the conical surface which it engages.

This conical surface and elastomeric ring relation presents a number of advantages including greater facility with which the coupling and sections may be assembled in accurately guided axial alignment, simplicity in the coupling structure, and effective utilization of a simple elastomeric ring such as a deformed O-ring to achieve both power transmission and maintenance of a slippage factor.

Although variously usable in street sweepers as will appear, the invention has particular applicability to the mounting and driving of replaceable sweeper pickup brooms within which the couplings are installed in opposite ends of a tubular broom core so that the latter carries the outer coupling sections while the broom drive shaft mounts the inner sections. As will appear, at least one of the sections is axially adjustable relative to the outer section to controllably vary the clearance between the opposed conical surfaces and therefor the degree of deformation of the elastomeric ring and its resistance to slippage.

The invention has for a further and specific object to so utilize the coupling sections within a broom core that when the broom requires replacement, the drive components can readily be disassembled with the outer conical sections remaining attached to the core shell, and reassembled utilizing a similar replacement core easily and accurately mountable on the drive shaft which retains the inner conical sections.

The invention and its applicability to the driving of sweeper components referred to in the foregoing, will be more fully understood from the following detailed description of the accompanying drawings:

BRIEF DESCRIPTION OF THE DRAWINGS

FIG. 1 is a sectional illustration of the invention as applied to the mounting of a road sweeper pickup broom on its drive shaft assembly;

FIG. 2 shows in cross section a variational form of the invention as used for power transmission to a street sweeper gutter broom which constitutes the debris displacement means;

DESCRIPTION OF THE PREFERRED EMBODIMENTS

Figure 3:
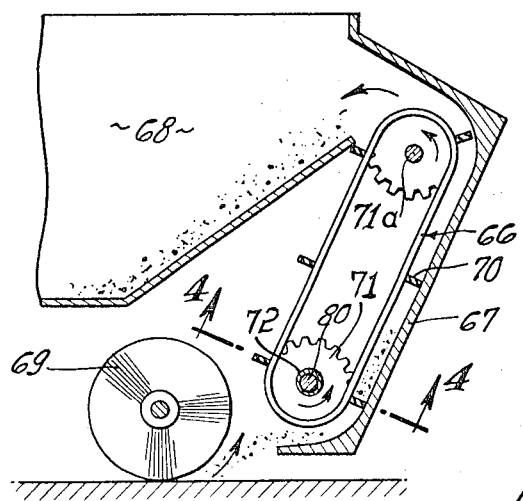
FIG. 3 is a sectional view showing diagrammatically the general configuration of a street sweeper belt or chain type conveyor.

Referring first to the pickup broom assembly appearing in FIG. 1, the broom generally indicated at 10 is shown to be carried in a usual manner by arms 11 and 12 mounted to the sweeper vehicle for swinging or other displacement in accordance with road surface irregularities or other like conditions encountered by the broom. The latter is mounted for rotation on its drive shaft 13, the rotation being transmitted by way of the later described conical coupling sections to the tubular broom core 14 and bristles 15, which in this instance constitute the debris displacement means. It will be understood that the bristles may be mounted to the core 14 in any suitable manner as within holders 16 applied annularly or spirally about the core and held thereto. Shaft 13 is driven by stub shaft 17 received within counterbore 18 and driven by motor M, the housing of which has an extension 19 received and fixed within the arm 12. At its opposite end the shaft 13 is rotatably carried within arm 11 by way of bearing retainer 20 removably held to the arm by bolts 21, the retainer 20 having curved flange 22 which engages and positions the outer race ring 24 of roller bearing 23. The inner race ring 25 is held to the shaft 13 for rotation therewith.

One end of the broom core 14 contains what may be termed an outer conical coupling section 26 temporarily or permanently welded or otherwise secured to the core at 27. Within its opposite end the core 14 contains a similar outer coupling section 28 which as in the case of section 26 may be permanently or impermanently secured at 29 to the core. The coupling sections 26 and 28 have inner conical surfaces 30 and 31 of annular cross section which receive the correspondingly tapered surfaces of inner sections 32 and 331, the latter being formed as a truncated conical enlargement of the driven end of shaft 13 keyed at 332 to the motor shaft within annulus or clamp ring 333. Clearances at 33 and 36 between the inner and outer conical surfaces may be maintained by providing suitable shoulders at 35 and 37 engageable respectively by inner sections 32 and 331 in accordance with the degree of relative axial adjustment of the inner sections on the shaft 13.

Such adjustment is effected by screw 39 threaded at 40 into the shaft 13 and adjustable to shift the shaft axially and in so doing to bring sections 32 and 331 relatively together or apart while maintaining fixed relation between section 32 and race ring 25 by reason of their engagement at 34. Section 32 may or may not be positively driven by the shaft 13 although a driving relation may be assumed by the showing of key 42.

Interposed between the conical surfaces are elastomeric rings 43 and 44 shown to be accommodated within annular recesses 45 and 46 within the outer sections 28 and 26. It will be understood that these rings may be contained within either the outer or inner conical surfaces although the illustrated arrangement is preferred. The drawing shows the elastomeric rings in deformed condition by reason of their pressural confinement against the inner conical surfaces.

As installed and while unstressed the rings may be essentially circular in cross section similar to commonly termed O-rings. By adjustment of screw 39 the clearances at 31 and 33 and therefore the degree of compressive deformation of rings 43 and 44 may be subject to variation depending upon the desired brush resistance to rotation with the drive shaft 13. Normally the adjustment will be such that as the brush encounters abnormal resistance to positively driven rotation, the elastomeric rings are capable of rotation on and about the inner conical sections until such resistance is relieved.

FIG. 2 illustrates a single coupling adaptation of the invention to the drive of a conventional gutter broom 50 mounted to the sweeper vehicle in any suitable manner and driven by motor 51 carried by suitable support 52. The driven motor shaft 53 is keyed at 54 within annulus or clamp ring 55 to the inner coupling section 56 having a frustoconical surface 57 received within correspondingly tapered surface 58 of the outer coupling section 59 which may be integrated in any suitable manner with the gutter broom structure 60. As before, one or the other of sections 56 and 59 may be recessed to contain an elastomeric ring 61 variably deformable by adjustment of screw 63 threaded into the shaft 53 and bearing against the washer 64.

By adjustment of the screw, the inner section 56 may be shifted axially of the shaft to vary the clearance between the section and therefore the extent of deformation of the elastomeric ring 61. As the gutter broom encounters abnormal resistance to rotation by the motor 51, the elastomeric ring 61 becomes capable of slippage on the inner cone surface until the resistance normalizes.

Figure 4:
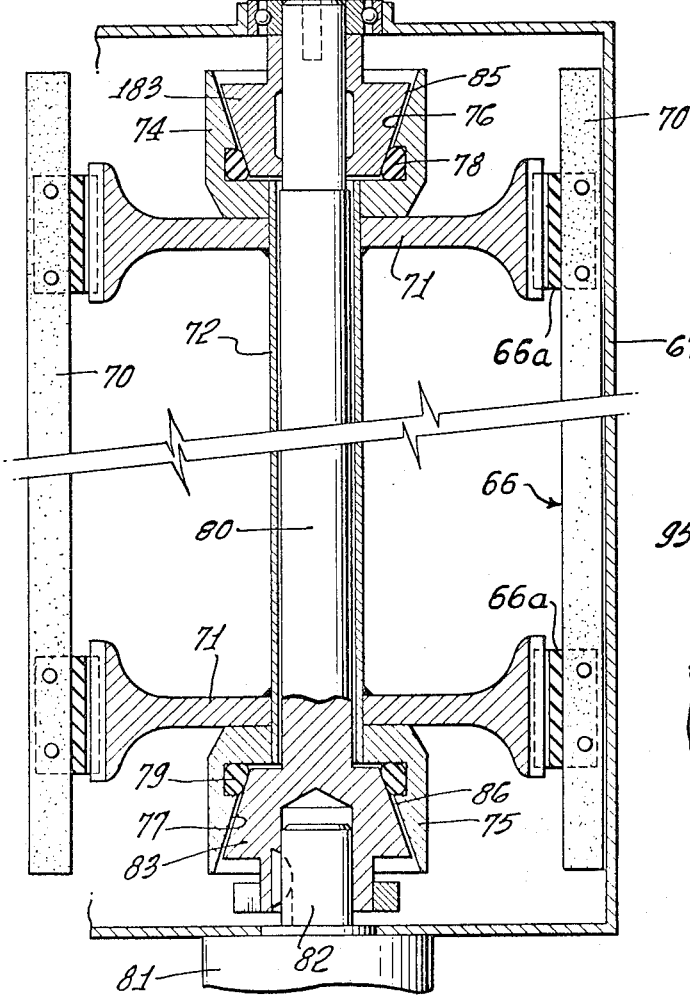
FIG. 4 is an enlarged cross section taken on line 4—4 of FIG. 3 showing a drive transmission in accordance with the invention.

In the variational form of the invention appearing in FIGS. 3 and 4 the dual cone section drive is shown to be used to power a conventional road sweeper endless belt or chain conveyor indicated generally at 66 operating within housing 67 to displace into dirt chamber 68 debrus received from the pickup broom 69. Here the conveyor is shown to comprise debris displacement squeegees 70 carried by cog belts 66a running over sprockets 71, 71a. The driving sprockets 71 are fixed to a tubular member 72 which in turn is fixedly received at its opposite ends within outer coupling sections 74 and 75 having inner frustoconical surfaces 76 and 77 within which are retained the deformed O-rings 78 and 79. A driving conveyor shaft 80 is disposed within the tubular member 72 and is driven by motor 81 having its stub shaft 82 received within and keyed to an inner conical coupling section 83. At its opposite end the shaft 80 mounts a second inner coupling section 183 and the shaft 80 is journalled for rotation within bearing 84 carried by the conveyor housing.

As before, the shaft and the clearances at 85 and 86 between the conical coupling surfaces are variable by adjustment of screw 87 threaded into the shaft to adjust accordingly the deformation of rings 78 and 79 and therefore the slippage potential of ring 79 on the inner section 18. In this instance the conveyor is shown to be positively driven only at the motor end of the shaft by slippage-capable power transmission through ring 79, the opposite end of the shaft being rotatable within the inner section 183. In the event the squeegees encounter abnormal resistances as by abnormal variations in the displaced debris, over-stressed condition is avoided by the capacity of the outer coupling section for slippage about the inner section.

Figure 5:
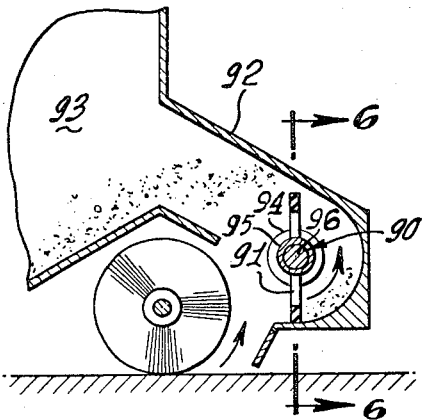
FIG. 5 is a view similar to FIG. 3 illustrative of a single rotary type sweeper conveyor.
Figure 6:
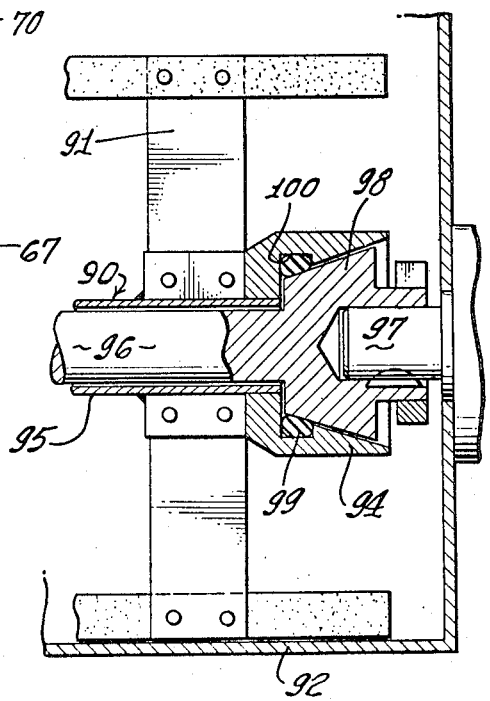
FIG. 6 is an enlarged fragmentary cross section on line 6—6 of FIG. 5 illustrative of the shaft drive.

In reference to the further variational form of the invention appearing in FIGS. 5 and 6, here the conveyor is shown to comprise a shaft assembly indicated generally at 90 carrying squeegee arms 91 rotatable within the housing 92 to displace debris into the chamber 93. As shown in FIG. 6 the arms 91 are carried by an outer coupling section 94 mounted to tubular member 95 of shaft assembly 90 and corresponding to member 72 in FIG. 4. An inner conveyor shaft 96 of the shaft assembly 90 is driven by the motor shaft 97 received within the inner coupling section 98. As before, the power transmission with clippage capacity is by way of the elastomeric ring 99 received within recess 100 in the outer section.

As will be understood without necessity for repetitious description, the opposite end of shaft 96 may be accommodated for axial adjustment and received within inner and outer housing-supported coupling sections as previously described in reference to FIG. 4.

I claim:

1. In a street sweeper, the combination of a power transmitting coupling between rotationally driving and driven parts comprising inner and outer sections having opposed conical surfaces of circular cross section, an elastomeric ring contained in an annular recess in one of said surfaces and engaging the other surface and functioning to transmit rotational drive from one to the other of said sections, and debris displacement means driven by the outer coupling section and operating to produce slippage in relative rotation of the sections as abnormal resistances to debris displacement are encountered.

2. A drive according to claim 1, including means for deforming said ring under variable radial compression permitted by clearance between said conical surfaces.

3. A drive according to claim 2, in which said ring is capable of slippage on the conical surface which it engages in response to relative rotational resistance between the sections.

4. A drive according to claim 2, in which said sections are axially relatively movable and adjustable, and stop means is provided to limit such movement and deformation of the ring.

5. A drive according to claim 2, including also a shaft extending within said inner section, and means carried by the shaft for adjustably varying said clearance and compression of the ring.

6. A drive according to claim 5, in which said means includes a bolt held against axial movement and threaded into said shaft.

7. A drive according to claim 1 in which the debris displacement means comprises a sweeper broom carried by said outer section of the coupling.

8. A drive according to claim 1, in which said coupling is contained within and the outer section is joined to a rotatably driven broom core.

9. A drive according to claim 1, in which a pair of said couplings are contained within opposite ends of a rotatably driven broom core.

10. A drive according to claim 9, including also adjustable means for moving said inner sections relatively together to variably deform the rings as permitted by clearances between the conical surfaces.

11. A drive according to claim 10, in which the broom core is mounted on a shaft extending through a first of said inner sections and carrying adjustable means for moving the last mentioned section axially relative to the other inner section.

12. A drive according to claim 11, in which rotational drive is frictionally transmitted by said rings and the rings are capable of slippage on the conical surfaces which they engage in response to abnormal resistance to rotation of the broom core.

13. A drive according to claim 12, in which said adjustable means comprises a bolt extending axially within and threaded into one end of the shaft, a bearing within which said end of the shaft is rotatable, and means for driving the opposite end of the shaft.

14. A replaceable street sweeper broom comprising a tubular bristle-carrying core, and a pair of annular members inside of and fixed to the core, said members having inner conical surfaces of annular cross section with their diameters progressively reducing inwardly of the core and adapted to rotate with correspondingly externally tapered conical members on a broom drive shaft; the improvement wherein the inner conical surfaces of said annular members are of circular cross section and wherein the inner surface of one of said annular members contains an elastomeric deformable ring to be frictionally driven by the corresponding conical member on the drive shaft.

15. A replaceable broom according to claim 14, wherein a stop shoulder is formed on the ring-containing member for engaging the member on said shaft to limit deformation of the ring.

16. A replaceable broom according to claim 14, wherein said annular members both contain deformable rings as defined.

17. A replaceable broom according to claim 16, wherein both of said annular members have stop shoulders as defined.

* * * * *